US007806713B1

(12) United States Patent
Harris

(10) Patent No.: US 7,806,713 B1
(45) Date of Patent: Oct. 5, 2010

(54) HIGH SPEED RADIO FREQUENCY CABLE CONNECTOR INTERFACE STABILIZATION SYSTEMS AND METHODS

(75) Inventor: David Bennitt Harris, Columbia, MD (US)

(73) Assignee: Ciena Corporation, Linthicum, MD (US)

( * ) Notice: Subject to any disclaimer, the term of this patent is extended or adjusted under 35 U.S.C. 154(b) by 0 days.

(21) Appl. No.: 12/410,059

(22) Filed: Mar. 24, 2009

(51) Int. Cl.
*H01R 4/50* (2006.01)
*H01R 13/625* (2006.01)

(52) U.S. Cl. .................................... 439/345; 248/68.1
(58) Field of Classification Search ................. 439/345, 439/469, 470, 471, 474, 308, 368, 459; 248/73; 385/88
See application file for complete search history.

(56) References Cited

U.S. PATENT DOCUMENTS

| | | | | |
|---|---|---|---|---|
| 3,927,765 A | * | 12/1975 | Beal | 206/481 |
| 5,123,071 A | * | 6/1992 | Mulholland et al. | 385/53 |
| 5,343,547 A | * | 8/1994 | Palecek et al. | 385/76 |
| 5,383,796 A | * | 1/1995 | Bowen et al. | 439/469 |
| 5,398,295 A | * | 3/1995 | Chang et al. | 385/58 |
| 5,545,848 A | * | 8/1996 | Lin | 361/759 |
| 5,748,821 A | * | 5/1998 | Schempp et al. | 385/76 |
| 5,788,528 A | * | 8/1998 | Orr et al. | 439/358 |
| 6,045,390 A | * | 4/2000 | Metz et al. | 439/405 |
| 6,427,953 B1 | * | 8/2002 | Dickens | 248/68.1 |
| 6,592,266 B1 | * | 7/2003 | Hankins et al. | 385/53 |
| 7,077,688 B2 | * | 7/2006 | Peng | 439/471 |
| 7,354,297 B2 | * | 4/2008 | Tsukashima et al. | 439/449 |

* cited by examiner

*Primary Examiner*—Hae Moon Hyeon
(74) *Attorney, Agent, or Firm*—Clements Bernard PLLC; Christopher L. Bernard; Lawrence A. Baratta, Jr.

(57) ABSTRACT

The present disclosure provides a cable connector interface stabilization system, including: a component; one or more cables coupled to the component through one or more connectors; a spacer block disposed adjacent to the one or more connectors; and a retention member disposed adjacent to the one or more connectors opposite the spacer block and selectively secured to the spacer block, thereby securing the one or more connectors, and thereby securing the one or more cables to the component. The spacer block disposed adjacent to the one or more connectors is attached to one of a board and a heatsink assembly. The spacer block and the retention member surround the one or more connectors. The spacer block and the retention member secure the one or more connectors and secure the one or more cables to the component such that the associated connector-to-component interface(s) are fixed and immovable, ensuring that the associated electrical parameter(s) remain constant over time.

20 Claims, 5 Drawing Sheets

HIGH SPEED RADIO FREQUENCY CABLE CONNECTOR INTERFACE STABILIZATION SYSTEMS AND METHODS

FIELD OF THE INVENTION

The present invention relates generally to high-speed communication systems and the like. More specifically, the present invention relates to high speed radio frequency (RF) cable connector interface stabilization systems and methods for use with 40G and 100G transceiver circuit packs and the like.

BACKGROUND OF THE INVENTION

As bandwidth evolves, high-speed communication systems are being designed for ever increasing bandwidth and signal speeds. Conventional high speed communication systems operate at 10 Gb/s and 40 Gb/s and technology is emerging towards 100 Gb/s system. These associated high speed bit rates require electronic designs to accommodate high RF signals, such as 10 GHz for 10G, 40 GHz for 40G, 100 GHz for 100G, etc.

There are various existing high speed RF cable connector systems. GPO subminiature push-on (SMP) and GPPO subminiature push-on miniature (SMPM) RF cable connector interfaces are two exemplary systems (GPO and GPPO are registered trademarks of Corning Gilbert, Inc., Glendale, Ariz.). A GPO-style push-on connector has an inner female-to-female component, called a bullet or blindmate, and two outer panel or circuit mounted receptacles called shrouds. The GPO-style push-on connector allows connections without threads at all avoiding use of wrenches or the like. Push-on connectors are easier than other types of connectors to put on and take off, but care must be taken to avoid accidental removal.

Conventional high speed GPO subminiature push-on (SMP) and GPPO subminiature push-on miniature (SMPM) RF cable connector interfaces and the like rely on the detent holding features of the connectors themselves to hold the connectors to a component or the like. These detent holding features typically do not ensure signal integrity at or above about 40G for optical communication systems and the like that require matched signal lengths among coaxial cable pairs. For example, one application of GPO (SMP) or GPPO (SMPM) RF cable connectors includes RF connections for to high-speed optical modulators and/or lasers. The detent holding features simply do not provide stability of the associated cable-to-component connector interfaces. Any movement at these connector interfaces adversely affects the performance of 40G and 100G optical communication systems and the like. Specifically, any movement can impair the electromagnetic characteristics of the GPO (SMP) or GPPO (SMPM) RF cable connectors thereby affecting the high-speed RF signal.

One solution to this problem is the use of a stabilizing screw-in high-speed GPO (SMP) or GPPO (SMPM) RF cable connector interface. This solution, however, requires cable and component connector compatibility—effectively requiring cables and components to be obtained from the same manufacturer.

Thus, what are still needed in the art are high speed RF cable connector interface stabilization systems and methods that may be used with multiple cables, connectors, and components in a variety of configurations.

BRIEF SUMMARY OF THE INVENTION

In various exemplary embodiments, the present invention provides high speed RF cable connector interface stabilization systems and methods that may be used with multiple cables, connectors, and components in a variety of configurations. These high speed RF cable connector interface stabilization systems and methods may be used in a variety of applications that are comparable to, but not necessarily limited to, 40G and 100G optical communication systems and the like.

In one exemplary embodiment, the present invention provides a cable connector interface stabilization system, including: a component; one or more cables coupled to the component through one or more connectors; a spacer block disposed adjacent to the one or more connectors; and a retention member disposed adjacent to the one or more connectors opposite the spacer block and selectively secured to the spacer block, thereby securing the one or more connectors, and thereby securing the one or more cables to the component. The spacer block disposed adjacent to the one or more connectors is attached to one of a board and a heatsink assembly. The spacer block and the retention member surround the one or more connectors. The spacer block and the retention member secure the one or more connectors and secure the one or more cables to the component such that the associated connector-to-component interface(s) are fixed and immovable, ensuring that the associated electrical parameter(s) remain constant over time.

In another exemplary embodiment, the present invention provides a cable connector interface stabilization method, including: providing a component; coupling one or more cables to the component through one or more connectors; disposing a spacer block adjacent to the one or more connectors; and disposing a retention member adjacent to the one or more connectors opposite the spacer block and selectively securing the retention member to the spacer block, thereby securing the one or more connectors, and thereby securing the one or more cables to the component. The method further includes exerting an axial load on the one or more connectors through the space block and the retention member. The method also includes attaching the spacer block disposed adjacent to the one or more connectors to one of a board and a heatsink assembly. The spacer block and the retention member surround the one or more connectors. The spacer block and the retention member secure the one or more connectors and secure the one or more cables to the component such that the associated connector-to-component interface(s) are fixed and immovable, ensuring that the associated electrical parameter(s) remain constant over time.

In a further exemplary embodiment, the present invention provides a cable connector interface stabilization system, including: a component coupled to a structure of an optical communication system; one or more cables coupled to the component through one or more connectors; a spacer block disposed adjacent to the one or more connectors and attached to the structure of the optical communication system; and a retention member disposed adjacent to the one or more connectors opposite the spacer block and selectively secured to the spacer block, thereby securing the one or more connectors, and thereby securing the one or more cables to the component. The structure of the optical communication system comprises one of a board and a heatsink assembly.

BRIEF DESCRIPTION OF THE DRAWINGS

The present invention is illustrated and described herein with reference to the various drawings, in which like reference numbers are used to denote like system components/method steps, as appropriate, and in which.

DETAILED DESCRIPTION OF THE INVENTION

In various exemplary embodiments, the present invention provides high speed RF cable connector interface stabilization systems and methods that may be used with multiple cables, connectors, and components in a variety of configurations. These high speed RF cable connector interface stabilization systems and methods may be used in a variety of applications that are comparable to, but not necessarily limited to, 40G and 100G optical communication systems and the like. Advantageously, the present invention provides systems and methods for securing RF coaxial cables of any type with any type of pluggable circular connection system thus ensuring electrical parameters at the interface do not change. For example, such requirements are critical for 40G and 100G optical communication systems among others.

Figure 1:
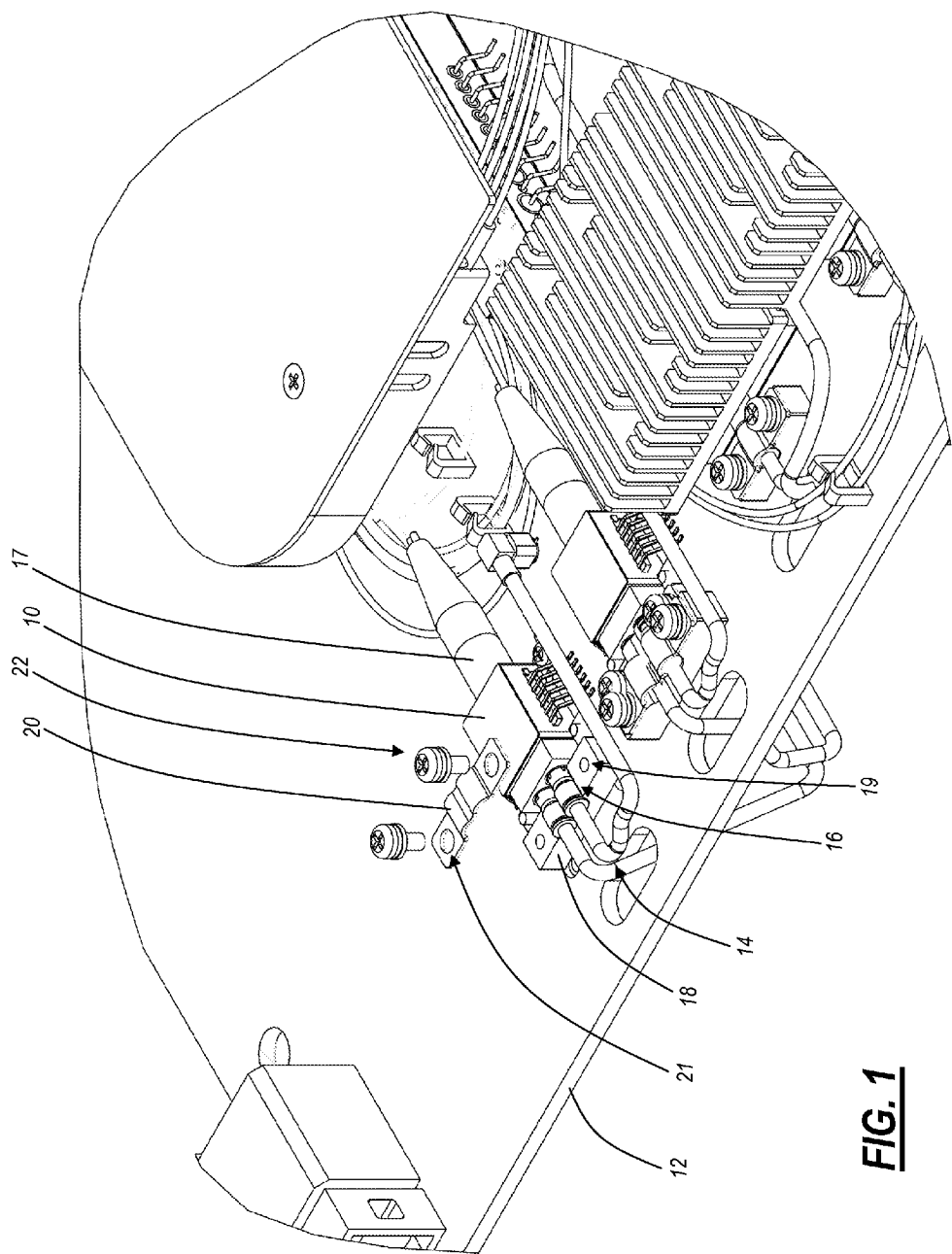
FIG. 1 is a partially exploded perspective view illustrating one exemplary embodiment of the high speed RF cable connector interface stabilization system of the present invention, utilizing a board mounted clamp spacer block, multiple cables and connectors, and a corresponding spring clamp.

Referring to FIG. 1, in one exemplary embodiment of the present invention, a component 10 is mounted to a board 12 of an optical communication system or the like. One or more cables 14 are initially coupled to the component 10 via one or more connectors 16 utilizing the detent holding features of the connectors 16. As described above, the optical communication system or the like may be a 40G and 100G transceiver circuit pack or the like, the one or more cables 14 may be one or more high speed GPO (SMP) or GPPO (SMPM) RF cables or the like, and the one or more connectors may be one or more high speed GPO (SMP) or GPPO (SMPM) RF connectors or the like. The component 10 may include a modulator, a laser, or any other component receiving a high-speed RF signal connection. For example, the component 10 may include an RF input through the connectors 16 and an optical output through one or more optical connections 17.

Additionally, the one or more cables 14 may be routed on and around the board 12 in a manner that provides stabilization. For example, the one or more cables 14 may be encased in a rigid or semi-rigid material thereby providing stabilization. The exact natures of the component 10, board 12, optical communication system, one or more cables 14, and one or more connectors 16 are not important to the systems and methods of the present invention, except as regards the need for stability of the associated cable-to-component connector interfaces in order to maintain signal integrity. The present invention contemplates any system utilizing high-speed RF cables and connectors, such as, but not necessarily limited to, optical switches, data routers and switches, cable modems and telephony, and the like.

A clamp spacer block 18 (or, more generally, a "spacer block") is mounted to the board 12 beneath the one or more connectors 16. This clamp spacer block 18 may be made of any suitable flexible, semi-rigid, or rigid material(s) and is sized/configured such that it conforms to the one or more connectors 16 to a desired degree. In the exemplary embodiment illustrated, the clamp spacer block 18 is a single layer substantially rectangular prismatic structure having a length/width that is substantially greater than its thickness. The clamp spacer block 18 may be mounted to the board 12 using one or more screws or other mechanical fastening means, an adhesive, etc., or it may be integrally formed with the board 12.

A spring clamp 20 (or, more generally, a "retention member") is selectively secured to the clamp spacer block 18 about the one or more connectors 16 using one or more screws 22 or other mechanical fastening means—thereby selectively securing the one or more connectors 16 to the component 10. Accordingly, the spring clamp 20 may also be made of any suitable flexible, semi-rigid, or rigid material(s) and is also sized/configured such that it conforms to the one or more connectors 16 to a desired degree. For example, the spring clamp 20 may include conformal arches for one connector, for two connectors, etc. In the exemplary embodiment illustrated, the spring clamp 20 is an elongate structure having a length/width that is substantially greater than its thickness. It includes one or more holes 21 configured to receive the one or more screws 22 or other mechanical fastening means. Likewise, the clamp spacer block 18 may include one or more corresponding holes 19 configured to receive the one or more screws 22 or other mechanical fastening means. Optionally, the clamp spacer block 18 and spring clamp 20 engage substantially the entire outside diameter of each of the one or more connectors 16. This ensures that the critical connector-to-component interface is fixed and immovable, ensuring that the associated electrical parameters remain constant over time which is critical at high-speed RF rates such as 40G and 100G.

For example, the board 12 may form a circuit pack, line card, or the like. As is common, circuit packs, line cards, etc. are shipped and handled by technicians and operators. These actions can include shipment from a factory or the like, shipment from a warehouse or the like, installation into a communication system, etc. Accordingly, the present invention stabilizes the RF interface between the one or more connectors 16 and the component 10 ensuring the electromagnetic parameters of the one or more connectors 16 are preserved.

In another exemplary embodiment, the various components such as the spacer block 18, the spring clamp 20, and the like may be configured to generate an axial load on the one or more connectors 16. For example, this axial load exerts a force on the one or more connectors 16 thereby holding them tight axially in the component 10 mating connector. This augments the stability of the cable 14 to component interface since now it has an axial load applied along with being held tightly in place around the circumference.

Figure 2:
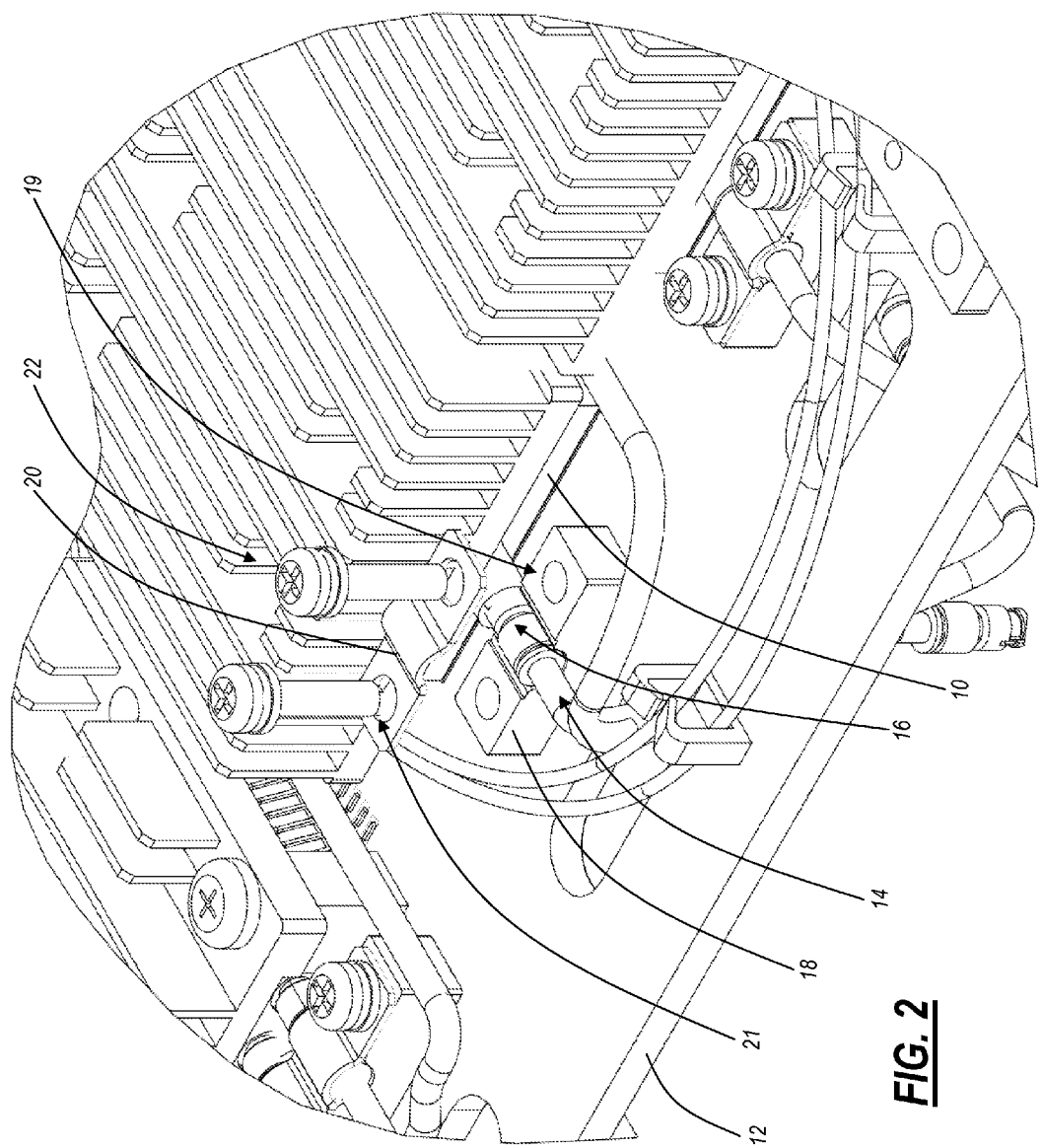
FIG. 2 is a partially exploded perspective view illustrating another exemplary embodiment of the high speed RF cable connector interface stabilization system of the present invention, utilizing a board mounted clamp spacer block, a single cable and connector, and a corresponding spring clamp.

Referring to FIG. 2, in another exemplary embodiment of the present invention, a single cable/single connector version of the cable connector interface stabilization system is illustrated.

Figure 3:
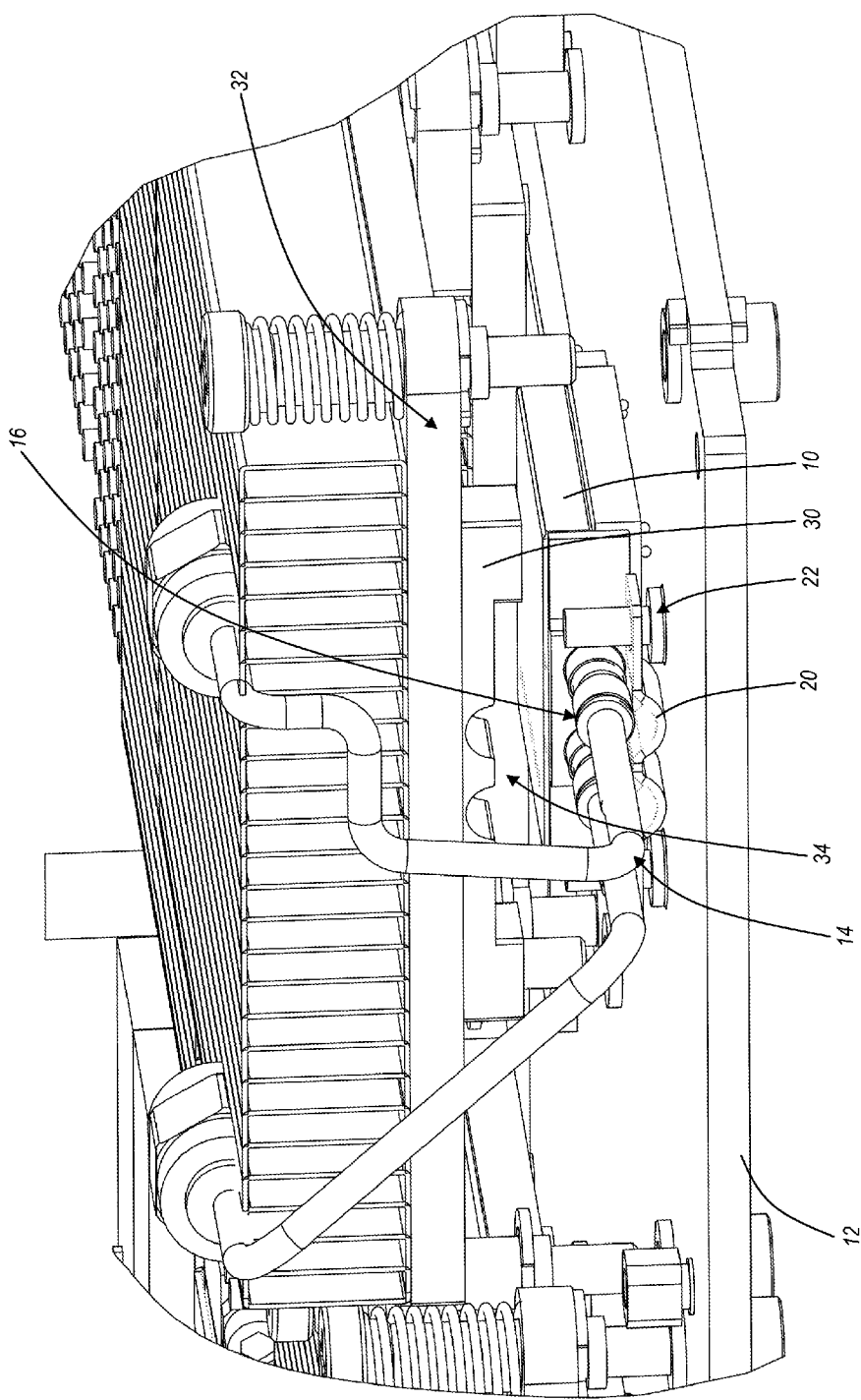
FIG. 3 is a partially exploded perspective view illustrating a further exemplary embodiment of the high speed RF cable connector interface stabilization system of the present invention, utilizing a heatsink mounted clamp spacer block, multiple cables and connectors, and a corresponding spring clamp.

Referring to FIG. 3, in a further exemplary embodiment of the present invention, a component 10 is again mounted to a board 12 of an optical communication system or the like. One or more cables 14 are initially coupled to the component 10 via one or more connectors 16 utilizing the detent holding features of the connectors 16. As described above, the optical communication system or the like may be a 40G and 100G transceiver circuit pack or the like, the one or more cables 14 may be one or more high speed GPO (SMP) or GPPO (SMPM) RF cables or the like, and the one or more connectors may be one or more high speed GPO (SMP) or GPPO (SMPM) RF connectors or the like. The exact natures of the component 10, board 12, optical communication system, one or more cables 14, and one or more connectors 16 are not important to the systems and methods of the present invention, except as regards the need for stability of the associated cable-to-component connector interfaces in order to maintain signal integrity of the high-speed RF signal.

A clamp spacer block 30 is mounted to a heatsink assembly 32 above the one or more connectors 16. This clamp spacer block 30 may be made of any suitable flexible, semi-rigid, or rigid material(s) and is sized/configured such that it conforms to the one or more connectors 16 to a desired degree. In the exemplary embodiment illustrated, the clamp spacer block 30 is a single layer substantially rectangular prismatic structure having a length/width that is substantially greater than its thickness. The clamp spacer block 30 may be mounted to the heatsink assembly 32 using one or more screws or other mechanical fastening means, an adhesive, etc., or it may be integrally formed with the heatsink assembly 32. A spring clamp 20 is selectively secured to the clamp spacer block 30 about the one or more connectors 16 using one or more screws 22 or other mechanical fastening means—thereby selectively securing the one or more connectors 16 to the component 10. Accordingly, the spring clamp 20 may also be made of any suitable flexible, semi-rigid, or rigid material(s) and is also sized/configured such that it conforms to the one or more connectors 16 to a desired degree. For example, the spring clamp 20 may again include conformal arches for one connector, for two connectors, etc. In the exemplary embodiment illustrated, the spring clamp 20 is an elongate structure having a length/width that is substantially greater than its thickness. It includes one or more holes (not illustrated) configured to receive the one or more screws 22 or other mechanical fastening means. Likewise, the clamp spacer block 30 may include one or more corresponding holes (not illustrated) configured to receive the one or more screws 22 or other mechanical fastening means. Optionally, the clamp spacer block 30 and spring clamp 20 engage substantially the entire outside diameter of each of the one or more connectors 16. This again ensures that the critical connector-to-component interface is fixed and immovable, ensuring that the associated electrical parameters remain constant over time.

In the exemplary embodiment illustrated, it should be noted that several advantageous refinements have been made. First, the clamp spacer block 30 includes a cut-away portion 34 that is sized/configured to receive the spring clamp 20 when in place and when the heatsink assembly 32 has been secured to the board 12. Second, the board 12 itself includes one or more holes 36 (FIG. 4) configured to provide access to the one or more screws 22 or other mechanical fastening means. Other such advantageous refinements could also be made.

Figure 4:
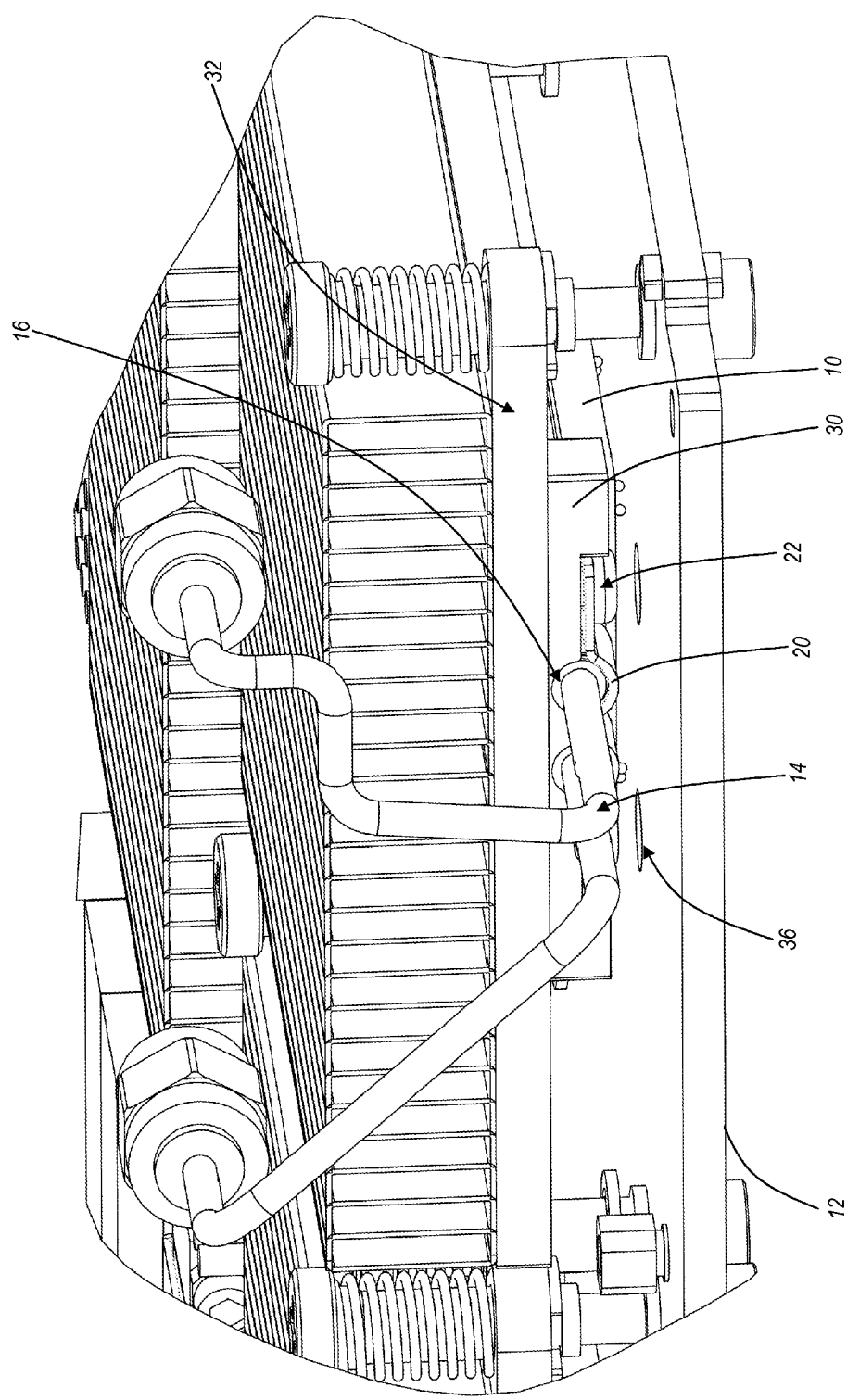
FIG. 4 is perspective view illustrating the high speed RF cable connector interface stabilization system of FIG. 3 in a fully assembled state.

Referring to FIG. 4, the cable connector interface stabilization system of FIG. 3 is illustrated in a fully assembled state. Here, the spring clamp 20 secures a barrel of the connector 16 to the clamp spacer block 30 thereby stabilizing the cable-connector interface as required in high-speed RF connections.

Figure 5:
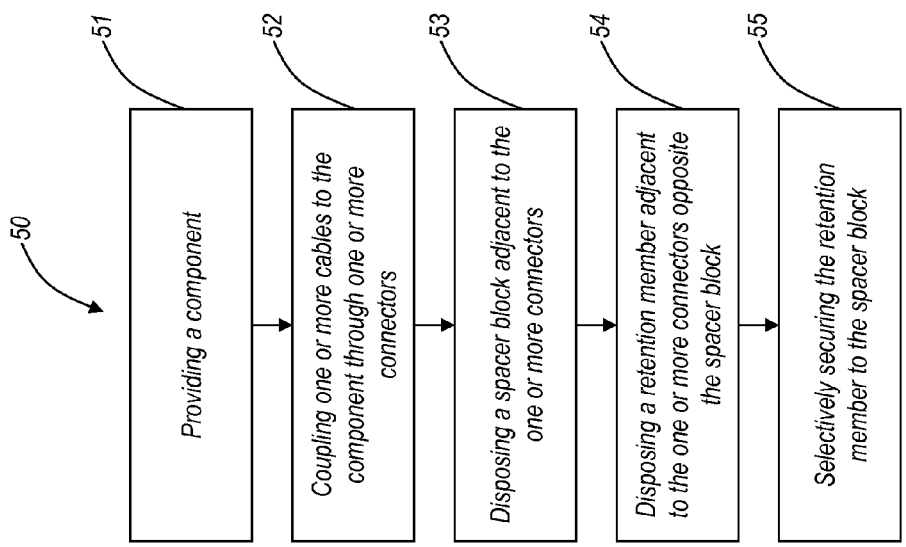
FIG. 5 is flowchart illustrating the high speed RF cable connector interface stabilization system of FIG. 3 in a fully assembled state.

Referring to FIG. 5, a cable connector interface stabilization method 50 is illustrated according to another exemplary embodiment of the present invention. The cable connector interface stabilization method 50 includes providing a component requiring a cable connection, e.g. a high-speed RF connection or the like (step 51). One or more cables are coupled to the component through one or more connectors, e.g. GPO (SMP) or GPPO (SMPM) RF connectors (step 52). A spacer block is disposed adjacent to the one or more connectors (step 53). A retention member is disposed adjacent to the one or more connectors opposite of the spacer block (step 54). Finally, the retention member is selectively secured to the spacer block thereby securing the one or more cables to the component (step 55). The spacer block and the retention member secure the one or more connectors and the one or more cables to the component such that the associated connector-to-component interface(s) are fixed and immovable, ensuring that the associated electrical parameter(s) remain constant over time as required by high-speed RF signal connections.

Although the present invention is illustrated and described herein with reference to preferred embodiments and specific examples thereof, it will be readily apparent to those of ordinary skill in the art that other embodiments and examples may perform similar functions and/or achieve like results. For example, as described above, the high speed RF cable connector interface stabilization systems and methods of the present invention may be used in a variety of applications that are comparable to, but not necessarily limited to, 40G and 100G optical communication systems and the like. All such equivalent embodiments and examples are within the spirit and scope of the present invention, are contemplated thereby, and are intended to be covered by the following claims.

What is claimed is:

1. A cable connector interface stabilization system, comprising:
    a component;
    one or more cables coupled to the component through one or more connectors;
    a spacer block disposed adjacent to the one or more connectors and mounted directly to a structure of an optical communication system; and
    a retention member disposed adjacent to the one or more connectors opposite the spacer block and selectively secured to the spacer block, thereby securing the one or more connectors to the structure of the optical communication system, and thereby securing the one or more cables to the component.

2. The cable connector interface stabilization system of claim 1, wherein the component comprises an optical communication system component.

3. The cable connector interface stabilization system of claim 1, wherein the one or more cables comprise one or more high speed SMP or SMPM RF cables.

4. The cable connector interface stabilization system of claim 1, wherein the one or more connectors comprise one or more high speed SMP or SMPM RF connectors.

5. The cable connector interface stabilization system of claim 1, wherein the spacer block disposed adjacent to the one or more connectors is attached to one of a board and a heatsink assembly.

6. The cable connector interface stabilization system of claim 1, wherein at least a portion of the spacer block is conformal to the one or more connectors.

7. The cable connector interface stabilization system of claim 1, wherein at least a portion of the retention member is conformal to the one or more connectors.

8. The cable connector interface stabilization system of claim 1, wherein the spacer block and the retention member surround the one or more connectors.

9. The cable connector interface stabilization system of claim 1, wherein the spacer block and the retention member secure the one or more connectors and secure the one or more cables to the component such that the associated connector-to-component interface(s) are fixed and immovable, ensuring that the associated electrical parameter(s) remain constant over time.

10. A cable connector interface stabilization method, comprising:
providing a component;
coupling one or more cables to the component through one or more connectors;
disposing a spacer block adjacent to the one or more connectors and mounting the spacer block directly to a structure of an optical communication system; and
disposing a retention member adjacent to the one or more connectors opposite the spacer block and selectively securing the retention member to the spacer block, thereby securing the one or more connectors to the structure of the optical communication system, and thereby securing the one or more cables to the component.

11. The cable connector interface stabilization method of claim 10, further comprising exerting an axial load on the one or more connectors through the space block and the retention member.

12. The cable connector interface stabilization method of claim 10, wherein the one or more cables comprise one or more high speed SMP or SMPM RF cables.

13. The cable connector interface stabilization method of claim 10, wherein the one or more connectors comprise one or more high speed SMP or SMPM RF connectors.

14. The cable connector interface stabilization method of claim 10, further comprising attaching the spacer block disposed adjacent to the one or more connectors to one of a board and a heatsink assembly.

15. The cable connector interface stabilization method of claim 10, wherein at least a portion of the spacer block is conformal to the one or more connectors.

16. The cable connector interface stabilization method of claim 10, wherein at least a portion of the retention member is conformal to the one or more connectors.

17. The cable connector interface stabilization method of claim 10, wherein the spacer block and the retention member surround the one or more connectors.

18. The cable connector interface stabilization method of claim 10, wherein the spacer block and the retention member secure the one or more connectors and secure the one or more cables to the component such that the associated connector-to-component interface(s) are fixed and immovable, ensuring that the associated electrical parameter(s) remain constant over time.

19. A cable connector interface stabilization system, comprising:
a component coupled to a structure of an optical communication system;
one or more cables coupled to the component through one or more connectors;
a spacer block disposed adjacent to the one or more connectors and attached mounted directly to the structure of the optical communication system; and
a retention member disposed adjacent to the one or more connectors opposite the spacer block and selectively secured to the spacer block, thereby securing the one or more connectors to the structure of the optical communication system, and thereby securing the one or more cables to the component.

20. The cable connector interface stabilization system of claim 19, wherein the structure of the optical communication system comprises one of a board and a heatsink assembly.

* * * * *